No. 640,891. Patented Jan. 9, 1900.
J. W. EISENHUTH.
FOOTBOARD FOR VEHICLES.
(Application filed Oct. 19, 1899.)
(No Model.)
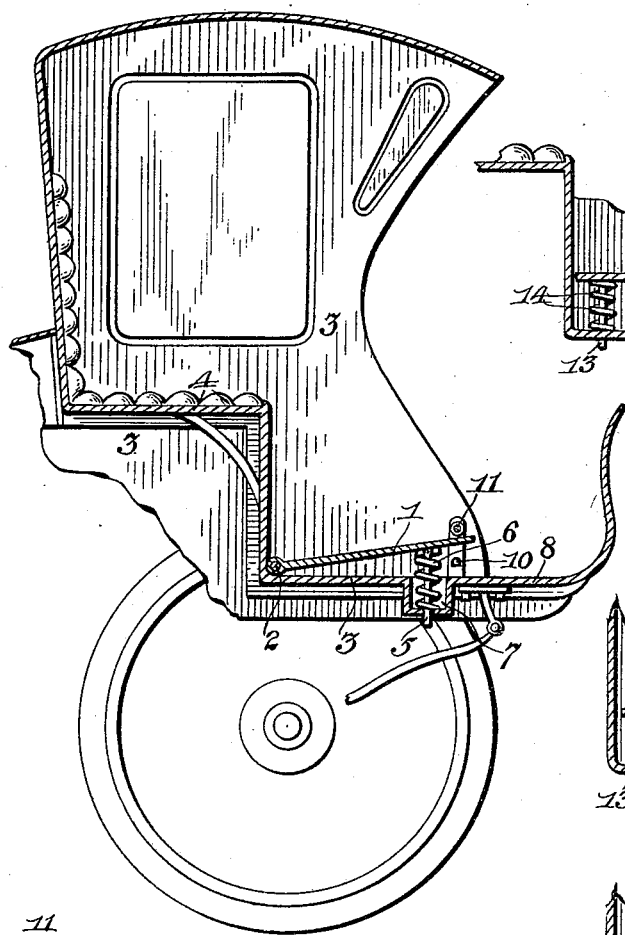
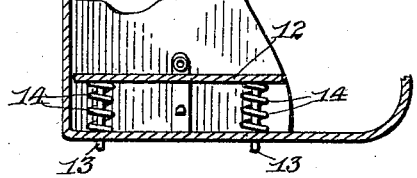
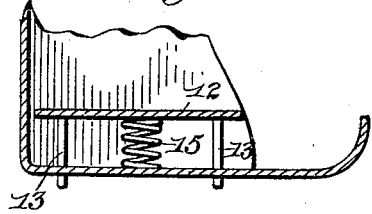
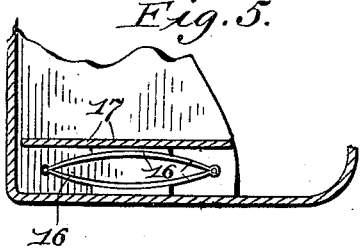
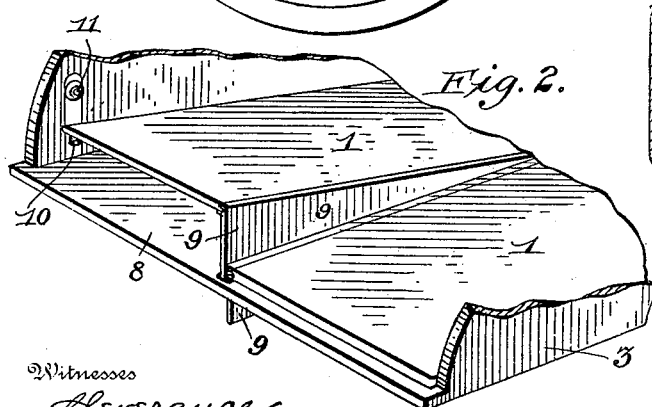
Witnesses
Inventor
John W. Eisenhuth
Attorneys

UNITED STATES PATENT OFFICE.

JOHN W. EISENHUTH, OF NEW YORK, N. Y., ASSIGNOR TO MAMIE G. READ, OF SAME PLACE.

FOOTBOARD FOR VEHICLES.

SPECIFICATION forming part of Letters Patent No. 640,891, dated January 9, 1900.

Application filed October 19, 1899. Serial No. 734,055. (No model.)

*To all whom it may concern:*

Be it known that I, JOHN W. EISENHUTH, a citizen of the United States, residing at New York, in the county of New York and State of New York, have invented certain new and useful Improvements in Footboards for Vehicles; and I do hereby declare the following to be a full, clear, and exact description of the invention, such as will enable others skilled in the art to which it appertains to make and use the same.

My invention relates to improvements in foot-rests for vehicles, such as cabs, carriages, buggies, and the like; and it consists in a pivoted floor or platform, springs for holding the said floor normally in its upper position, and a detent for holding the platform in its lowered position, the said detent being provided with means for disengaging it from the platform to permit it to rise again for use.

It also consists in certain other novel constructions, combinations, and arrangements of parts, as will be hereinafter fully described and claimed.

In the accompanying drawings, Figure 1 represents a vertical sectional view through a portion of a cab having a foot-rest constructed in accordance with the present invention. Fig. 2 represents a perspective view of the platforms, the cab being broken away. Fig. 3 represents a detail sectional view showing a different arrangement of the springs beneath the platform. Figs. 4 and 5 show still different ways of arranging the springs beneath the platform.

I find that in occupying a cab or other similar vehicle for a considerable length of time a person becomes tired of having his feet arranged in one position. I also find that it is a considerable rest to the party riding in the vehicle if he can have the position of the foot-rest or platform changed from time to time.

In carrying out the features of my invention I employ one or more platforms, as 1, which are preferably pivoted, as at 2, to the floor of a cab or vehicle, as 3. When pivotally mounted, the platforms are preferably pivoted just forward of the seat 4, while the free end of the platform is adapted to be raised or lowered to a suitable extent. Beneath each platform are arranged one or more depending rods, as 5, which form guides for springs 6, which surround the said guide-rods. The springs 6 normally hold the platforms in their upper positions. The springs may, if desired, rest in sockets, as 7, formed in the floor 8 of the cab or other vehicle, the guide-rods going through apertures in the bottom of the said sockets. When two or more platforms 1 1 are used, as illustrated in Fig. 2 of the drawings, their meeting edges are preferably provided with downwardly-turned flanges or projections, as 9 9, so that if one platform be raised while the other is still in its lowered position the space between the two will be closed, as will be clearly seen by reference to Fig. 2. It will be apparent, of course, that instead of employing two or more platforms I could use a single platform without departing from the spirit of the invention. In this case the platform would extend from one side of the cab or vehicle-body to the other, so that there would be no need for the depending side portions. In order to hold the platforms in their lowered positions, I preferably provide a detent, as 10, arranged at the side of the platform and near its forward free edge, the said detent being adapted to spring out upon the platform when it is depressed. The detent is also provided with a push-button, as 11, by which it may be forced inwardly to release the platform when it is desired to raise the same. This detent can be engaged by the foot, and may therefore be operated without a person having to stoop to the floor or to manipulate the parts by hand. When two or more platforms are used, it will be necessary to place a detent upon each side of the cab; but when only one is used a detent placed upon one side of the cab will usually be sufficient.

As seen in Figs. 3, 4, and 5 of the drawings, the platform instead of being pivoted may rest entirely upon the springs. Thus in Fig. 3 of the drawings the platform 12 is provided with guide-rods 13 13 at its corners, and springs 14 14 may be coiled around each of the said rods to raise the platform to the desired height. A detent will be used to hold this platform in its lowered position in the same manner as hereinbefore described. As seen in Fig. 4 of the drawings, the springs need not be placed about the guide-rods 14; but a spring, as 15, may be placed beneath the center of the footboard or platform. In Fig. 5 will be seen a still different manner of arranging the springs beneath the platform. In this instance elliptical springs, as 16, are employed, which are secured to the floor of the cab and the platform 17. It will be seen that by this construction and arrangement parties occupying a cab or other vehicle may, when seated therein, release the spring-detent with the foot, so that the platform will be raised to a convenient height to support the feet in a comfortable position. When it is desired to leave the cab, the weight of the person standing upon the platform will be sufficient to lower it, so as to be engaged by the spring-detent. The platform will preferably be thus held in its lowered position until it is again occupied, and a passenger stepping in upon the said platform and seating himself may again release the platform, as desired. When it is desired to change the position of the feet while riding for any length of time, the platform may be depressed for a while and then raised again as often as it is desired to change the position of the feet. This is very restful to a person having to take a long ride.

The parts of my improved platform or foot-rest will be found to be exceedingly simple and not likely to get out of order.

Having now described my invention, what I claim as new, and desire to secure by Letters Patent, is—

1. A foot-rest or platform for vehicles, comprising a footboard, springs arranged beneath the same to hold it normally in its upper position, and a detent for holding it in its lowered position, substantially as described.

2. A foot-rest or platform for vehicles, comprising a platform proper, guides secured to the under sides of the said platform and passing through apertures in the floor of the vehicle, springs interposed between the floor and the platform for elevating the latter, and one or more detents for holding the platform in its lowered position, substantially as described.

3. A foot-rest for vehicles, comprising a platform pivoted at its rear edge, springs located beneath its forward edge, and a detent for holding the forward edge in its lowered position, substantially as described.

4. A foot-rest for vehicles, comprising a platform, guides formed upon the under side of the said platform, said guides passing through apertures in the floor of the vehicle, depressed portions surrounding the said guides forming recesses in the floor, coil-springs surrounding the said guides and resting in the said recesses, and means for holding the platform in its lowered position, substantially as described.

5. A foot-rest for vehicles comprising a platform, springs located beneath the same for elevating it, a spring-pressed detent adapted to engage the edge of the platform for holding it in its lowered position, and a press-button for disengaging the said detent when it is desired to release the platform, substantially as described.

6. A foot-rest for vehicles, comprising a series of platforms, springs for elevating the said platforms, depending side portions arranged at the meeting edges of the said platforms, and means for holding the said platforms in their lowered positions, the construction being such that when one platform is lowered, the depending sides will close the space between the two, substantially as described.

In testimony whereof I hereunto affix my signature in presence of two witnesses.

JOHN W. EISENHUTH.

Witnesses:
VAN BUREN LAMB,
J. A. HILTON.